United States Patent Office 2,806,065
Patented Sept. 10, 1957

2,806,065

MANUFACTURE OF BIS-(β-HYDROXYALKYL-) POLYSULFIDES

Georg Spielberger, Leverkusen-Bayerwerk, Germany, assignor to Farbenfabriken Bayer Aktiengesellschaft, Leverkusen, Germany, a corporation of Germany No Drawing. Application March 18, 1953,
Serial No. 343,239

Claims priority, application Germany March 24, 1952

6 Claims. (Cl. 260—609)

This invention relates to bis-(β-hydroxyalkyl-)polysulfides and is more particularly concerned with an improved process for preparing bis-(β-hydroxyalkyl-)polysulfides.

In copending application Serial No. 343,240, filed March 18, 1953, a process is described for the production of bis-(β-hydroxyalkyl-)polysulfides which comprises reacting an 1,2-alkylene oxide with an alkali- or alkaline earth polysulfide and neutralizing the base liberated in the reaction in such a manner that the inorganic polysulfide is not decomposed to hydrogen sulfide and sulfur.

Now I have found that bis-(β-hydroxyalkyl-)polysulfides can be obtained from 1,2-alkylene oxides and alkali- or alkaline earth polysulfides if the base liberated in the reaction is bound with sulfur.

Thus, according to the present invention there is provided a process for the manufacture of bis-(β-hydroxyalkyl-)polysulfides which comprises reacting an 1,2-alkylene oxide with an alkali- or alkaline earth polysulfide and binding the base liberated in the reaction with sulfur.

The course of the reaction is believed to be as follows:

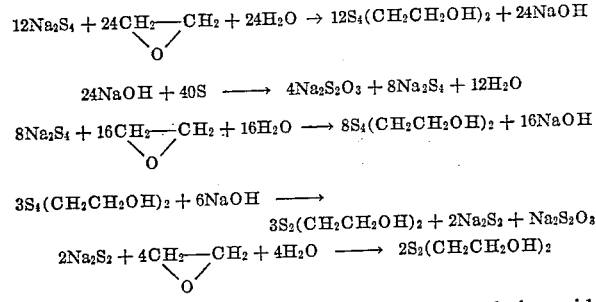

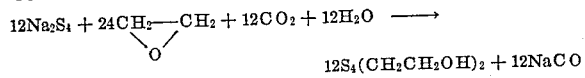

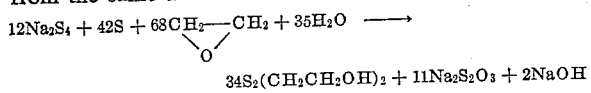

Whereas in accordance with the process of the said copending application Serial No. 343,240, filed March 18, 1953, 12 mols of bis-(β-hydroxyalkyl-)polysulfides can be obtained from 12 mols of sodium tetrasulfide:

$$12Na_2S_4 + 24CH_2\!\!-\!\!CH_2 + 12CO_2 + 12H_2O \longrightarrow$$
$$12S_4(CH_2CH_2OH)_2 + 12NaCO$$

the present invention makes it possible to produce a much greater proportion of bis-(β-hydroxyalkyl-)polysulfides from the same amount of sodium tetrasulfide:

$$12Na_2S_4 + 42S + 68CH_2\!\!-\!\!CH_2 + 35H_2O \longrightarrow$$
$$34S_2(CH_2CH_2OH)_2 + 11Na_2S_2O_3 + 2NaOH$$

It is apparent from the above equations that the sulfur content of the bis-(β-hydroxyalkyl-)polysulfides prepared by the method of this invention depends upon the ratio of the reactants and may be easily varied.

Since alkali- and alkaline-earth polysulfides are generally made by dissolving sulfur in an aqueous solution of the corresponding monosulfide or -hydroxide, it will suffice to add to the latter a greater proportion of sulfur than is required for the formation of the inorganic polysulfide and to introduce an 1,2-alkylene oxide into the mixture thus obtained in order to carry out the present invention.

A further advantage of the invention resides in the fact that alkali- and akaline-earth polysulfides possessing a high sulfur content are reacted with 1,2-alkylene oxides, whereas, for instance, a commercial sodium polysulfide of the formula $Na_2S_3$ always contains a certain amount of sodium monosulfide ($Na_2S$), giving rise to the formation of thioethers in the reaction with 1,2-alkylene oxides.

A still further advantage is that the inorganic polysulfides serving as starting materials are converted into thiosulfates in the process of the invention. Alkalithiosulfates and calcium thiosulfate are highly soluble in warm water so that very concentrated solutions can be handled without precipitation of an inorganic salt. When the reaction is complete, therefore, the two layers formed can be separated at elevated temperature in the absence of a solid substance whereupon the bulk of the thiosulfate can be precipitated by cooling the aqueous layer. The reaction can thus be carried out in a concentrated aqueous solution, the oily reaction product being salted out by the thiosulfate formed as a by-product.

It may be of advantage to add a wetting agent to the reaction mixture in order to speed up the solution of the sulfur in the aqueous medium. Among the wetting agents which may be used are alkyl sulfonates, alkyl aryl sulfonates and other surface-active substances indifferent to the reactants.

The process in accordance with the invention is preferably carried out at moderately elevated temperature in order to facilitate the solution of the sulfur in the reaction mixture. For this purpose it is unnecessary to heat because the reaction is exothermic. In certain cases it will even be indispensable to cool in order to moderate the reaction. Besides, the reaction temperature may be controlled by the rate at which the alkylene oxide is fed into the reaction mixture. It is desirable to provide intimate contact between the reactants by agitation.

The bis-(β-hydroxyalkyl-)polysulfides prepared in accordance with this invention are useful as intermediates for the manufacture of dyes, pharmaceuticals and agricultural chemicals.

The following examples serve to illustrate my invention without in any way limiting it, the parts being by weight:

*Example 1*

A mixture consisting of 290 parts of sodium sulfide ($Na_2S.9H_2O$), 250 parts of ground sulfur, 30 parts of water and 0.5 part of dibutyl-naphthanlene-sulfate is heated to 90 to 100° C. while stirring. After part of the sulfur has dissolved with formation of sodium polysulfide, the mixture is cooled to 70–80° C. Then about 45 parts of ethylene oxide per hour are fed to the mixture, the gas being absorbed with liberation of heat. After about 90 parts of ethylene oxide have been taken up, the whole sulfur has dissolved. On absorption of 245 parts of ethylene oxide, the layers are separated at elevated temperature.

The lower aqueous layer contains sodium thiosulfate and a small quantity of sodium polysulfide. The thiosulfate crystallizes out below 30° C., two thirds of the solution becoming solid.

The upper oily layer comprises 530 parts of bis-(hydroxyethyl-)polysulfide containing 11 percent of water. Reduction with sodium amalgam yields 65.5 percent of hydroxyethyl-mercaptan and 19.4 percent of hydrogen sulfide (in the form of their sodium salts). This shows that the polysulfide has the formula $(HOCH_2CH_2)_2S_{3.35}$.

If the reduction with sodium amalgam is carried out on a larger scale according to German Patent 737,334 and the mercaptan formed is extracted from the acidified solution with ether, 75 percent of hydroxyethyl-mercaptan, based on the ethylene oxide, are obtained. The distillation residue amounts to 4 percent, showing that only minor quantities of poly-(hydroxyethyl-)polysulfides have been formed.

*Example 2*

To the reaction mixture of Example 1 320 parts of ethylene oxide are added, at an hourly rate of 44 parts, in the same way and under the same condtitions as described in Example 1. After ethylene oxide has been introduced for 2 hours, the surplus sulfur has dissolved. On introduction of the whole ethylene oxide, the mixture is kept at 80° C. for another 10 minutes. Then the layers are separated at elevated temperature.

The yellow upper layer consists of 565 parts of bis-(hydroxyethyl-)polysulfide containing 6.5 percent of water and yielding 82.5 percent of hydroxyethyl-mercapton and 12.7 percent of hydrogen sulfide on reduction. Hence, the polysulfide has the formula $$(HOCH_2CH_2)_2S_{2.7}$$

I claim:

1. A process for preparing bis-(β-hydroxyalkyl-)polysulfides which comprises reacting, in the presence of water, an 1,2-alkylene oxide with a member selected from the group consisting of alkali- and alkaline-earth polysulfides and binding the base liberated in the reaction with sulfur.

2. A process for preparing bis-(β-hydroxyalkyl-)polysulfides which comprises introducing into a mixture of water sulfur and a member selected from the group consisting of alkali- and alkaline-earth polysulfides, an 1,2-alkylene oxide and binding the base liberated in the reaction with sulfur.

3. A process for preparing bis-(β-hydroxyalkyl-(polysulfides which comprises introducing into a mixture of water, sulfur and a member selected from the group consisting of alkali- and alkaline-earth hydroxides, an 1,2-alkylene oxide and binding the base liberated in the reaction with sulfur.

4. A process for preparing bis-(β-hydroxyalkyl-)polysulfides which comprises introducing into a mixture of water, sulfur and a member selected from the group consisting of alkali- and alkaline-earth monosulfides, an 1,2-alkylene oxide and binding the base liberated in the reaction with sulfur.

5. A process for preparing bis-(β-hydroxyalkyl-)polysulfides which comprises introducing into a mixture of water, sulfur and sodium sulfide an 1,2-alkylene oxide and binding the base liberated in the reaction with sulfur.

6. The process of claim 5 carried out in water at a temperature ranging from 0 to 100° C.

References Cited in the file of this patent

UNITED STATES PATENTS 2,257,290   Vorhees   Sept. 30, 1941
2,527,378   Bertozzi   Oct. 24, 1950

OTHER REFERENCES

Ephraim: "Inorganic Chemistry" (1948), page 536.